United States Patent [19]

Baillievier

[11] 4,268,573
[45] May 19, 1981

[54] REINFORCING CORDS

[75] Inventor: Freddy Baillievier, Zwevegem, Belgium

[73] Assignee: N.V. Bekaert S.A., Zwevegem, Belgium

[21] Appl. No.: 19,570

[22] Filed: Mar. 12, 1979

[30] Foreign Application Priority Data

Mar. 13, 1978 [LU] Luxembourg .......................... 79218

[51] Int. Cl.³ .............................................. D02G 3/36
[52] U.S. Cl. ...................................... 428/295; 57/212; 57/214; 57/218; 57/902
[58] Field of Search ................. 57/212, 214, 218, 902; 428/295

[56] References Cited

U.S. PATENT DOCUMENTS

| | | | |
|---|---|---|---|
| 2,598,033 | 5/1952 | Bourdon | 57/212 |
| 2,792,868 | 5/1957 | Benson | 57/212 |
| 3,032,963 | 5/1962 | Fenner | 57/212 |
| 3,486,546 | 12/1969 | Sidles | 57/902 |
| 3,600,884 | 8/1971 | Yazawa | 57/902 |
| 4,030,248 | 6/1977 | Assendelft | 57/212 |
| 4,051,661 | 10/1977 | Leprohon | 57/214 |

*Primary Examiner*—Paul R. Michl
*Attorney, Agent, or Firm*—Shlesinger, Arkwright, Garvey and Dinsmore

[57] ABSTRACT

A metal cord having a core comprising one or more filaments for the reinforcement of rubber articles comprising a plurality of bundles of grouped filaments wherein the direction of lay of the filaments in the bundles is the same as the direction of lay of the bundles in the cord, each of the filaments having been subjected to plastic torsional deformation, and the average length of lay of each bundle in the cord being substantially equal to the average length of lay of each filament in the bundles, and wherein at any cross-section of the cord the filament or filaments which comprise the core of the cord differ along the length of the cord and belong to the same or different bundles.

13 Claims, 6 Drawing Figures

REINFORCING CORDS

The present invention relates to metal reinforcing cords for the reinforcement of articles made of elastomeric material, such as vehicle tires, conveyor belts, transmission belts, flexible hoses and similar articles. Such cords may also be a useful reinforcement for articles made of rigid plastics material e.g. polyester resins or thermohardening epoxyresins. For convenience, all such materials will hereinafter be termed "rubber".

In service conditions, the metal cords that serve as reinforcement in the articles mentioned above can be intermittently overloaded by tensile or bending stresses or by axial compression, and may be subject to internal corrosion, which may cause a considerable deterioration of their mechanical and other properties.

Metal cords known to date consist mainly of a number of high-carbon (0.6–0.8%) steel filaments which are assembled into strands by a first twisting operation in order to obtain a given length of lay in a given direction, i.e. S or Z. A number of strands which may be of different kinds e.g. having different numbers of filaments are then assembled into the final cord by a second twisting operation, possibly with a certain length of lay around a core strand, and preferably in the opposite direction, i.e. Z or S.

Some existing metal cords have equidirectional lay that is, the filaments in the strands and the strands in the cord are laid in the same direction of twist, e.g. S. This is known as Lang's lay. The manufacture of such cords has been technically complicated and very expensive in order to obtain a uniform product without a rotational momentum (tendency to untwist) on the cord sections when cut. Moreover, cords in which the twisting of bundles and the twisting of filaments into bundles is made in the same direction and is carried out by a cabling operation, are not uniform in their elastic untwisting property. Methods to prevent this are expensive and cannot easily be controlled.

In existing cords, the ratio of the useful section to the circumferential section is limited. Moreover such cords show a considerable decrease in breaking load due to the crossing contacts between filaments. The internal abrasion of such cords will be concentrated on the contact points between the filaments and will limit the service life of the rubber articles, e.g. of truck tires.

It is an object of the invention to provide an improved metal reinforcement cord whose resistance to internal abrasion is high and whose tendency to untwist when cut is low.

According to the invention there is provided a metal cord for the reinforcement of articles of rubber as herein defined comprising a plurality of bundles of grouped filaments in which the average length of lay of each bundle in the cord is equal to the average length of lay of each filament in the bundles, the direction of lay of the filaments in the bundles being the same as that of the bundles in the cord, all said filaments having been subjected to plastic torsional deformation, the filaments locally constituting the core of the cord at any particular cross section belonging to one or to different bundles and being varied along the cord by filaments belonging to the same of different bundles.

The preferred number of bundles in the cord is two, three or four, and each bundle may contain between two and nineteen filaments, preferably less than ten.

The direction of twist and the average length of lay of the bundles in the cord are equal to those of the filaments in the bundles after the twisting operation which assembles the bundles into the cord. In such a metal cord each filament contacts its neighbouring filaments linearly along the length of the cord and the service life of such cords will be improved accordingly.

The number of filaments in one bundle is limited, the number of nineteen has been mentioned as possible but it is preferred to split the number of filaments into a higher number of bundles in order to obtain preferably less than ten filaments in one bundle. This structure of cord ensures that each filament maintains its individual properties, so that the number of filaments required can be predetermined accurately and not approximately. If the number of metallic filaments differs, it necessarily means a different cord type.

The metallic filaments used to compose the cords are preferably cold drawn wires, made of unalloyed high-carbon steel (0.6–0.8% C.). The breaking stress will be higher than 1000 N/mm$^2$ and preferably higher than 2.500 N/mm$^2$. For specific applications it will also be possible to use filaments made of stainless steel. The filaments may be covered with a brass coating. This outer brass layer is essentially a means of adhesion to the elastomeric material. Instead of brass, other well-known components of adhesion can be employed. The filament diameter will preferably be lower than 1 mm; 0.7 mm is a particularly suitable diameter for the reinforcement of high-bore flexible hoses, while the diameter of filaments used for motor vehicle tires is generally lower than 0.40 mm and is more preferably between 0.15 mm and 0.25 mm.

In the following description, the definition of filaments is used to indicate flexible metallic wires having an indefinite length and having a very small cross section of circular or any other profile. Assembled filaments behave as bending elements which form a flexible structure of great length.

The invention also extends to a manufacturing method of a metal cord for the reinforcement of rubber (as hereinbefore defined) articles including the steps of combining together a multiplicity of filaments to form a plurality of bundles having no lay, and combining the bundles together in a plastic torsional deforming bunching operation in such a way that the filaments in the bundles have an equal average length of lay and the same direction of lay as that of the bundles in the cord and the filaments locally constituting the core of the cord at any particular cross section belong to one or to different bundles and are varied along the cord by filaments belonging to the same or different bundles.

By bunching we mean that each element, i.e. filament or bundle, is twisted once about itself in every complete turn about the axis of the bundle or cord.

In one preferred embodiment of such a method, the bundles are twisted firstly to a length of lay less than the final length of lay, the cord is then untwisted to a length of lay greater than the final length of lay and twisted to the final length of lay and then subjected to a straightening and relaxing operation. Alternatively, it can be provided that the bundles are twisted firstly to a length of lay substantially equal to the final length of lay, the cord is then untwisted to a length of lay substantially equal to twice the final length of lay, and then twisted to the final length of lay and thereafter subjected to a straightening and relaxing operation.

In order that the invention may be readily understood an embodiment thereof will now be described by way of example with reference to the accompanying drawings, in which.

Figure 1:
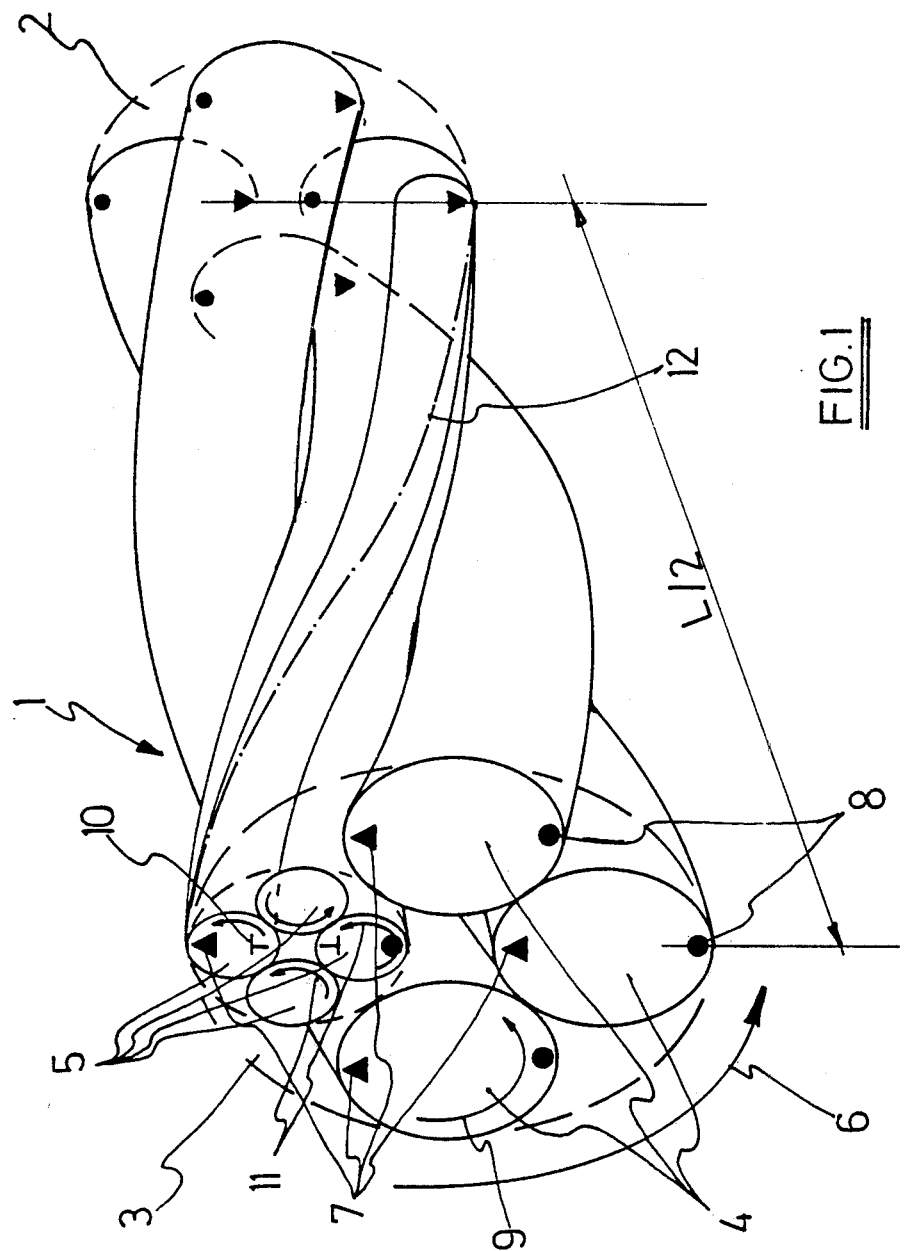
FIG. 1 is a schematic view of a section of cord in accordance with the invention.

FIG. 1 shows a length of cord 1, having a length L/2 whereby L is the length of lay. In between the rear plane 2 and the front plane 3, the drawing shows a cord consisting of four members 4 which in turn are built up by for example four elements 5. For the matter of clarity of the drawing, only one such member is shown in great detail.

In the rear plane 2, all filaments remain fixedly positioned so that any movement is prevented. The twisting operation can be understood if in the starting position all elements are imagined to be parallel and the front plane 3 is then turned (twisted), so that it remains in its own plane, but pivots through 180° around the cord axis as indicated by arrow 6. Due to this twist, each member 4 undergoes the same pivoting through 180° about its own axis, as shown by the triangular signs 7 of the circular signs 8 and indicated by the arrow 9. The twist of the individual filaments 5 is shown by the sign 10. Additionally it is shown that each filament 5 pivots through 180° about its own axis, as indicated by arrow 11.

The dotted line 12 represents a generatrix of an element 5, parallel to the cord axis and deformed by the twisting operation. It is necessary that the bundles are kept separated during the start of the twisting movement around their axes.

The secondary twist, generated during the operation, in the individual elements of the assembled members, is not obtained in any ordinary cabling machine. It is necessary to use a cage type or basket type buncher in which a member e.g. a flyer, revolving around a cradle, generates one or two twists in the cord at each revolving cycle. The device winding up the cord can be mounted inside the cradle.

The assembly of parallel filaments on spools which are unwound during the cord-making operation is not feasible. Even minor differences in length or tension will cause intolerable defects to the cord, such as undulations, bladders, kinks and others. These problems may be overcome in the manufacturing method according to the invention by spooling the filament bundles with a relatively large length of lay and unspooling them successively while neutralising the introduced lay. A suitable method is described in the Luxemburg Pat. No. 74 716.

Figure 2:
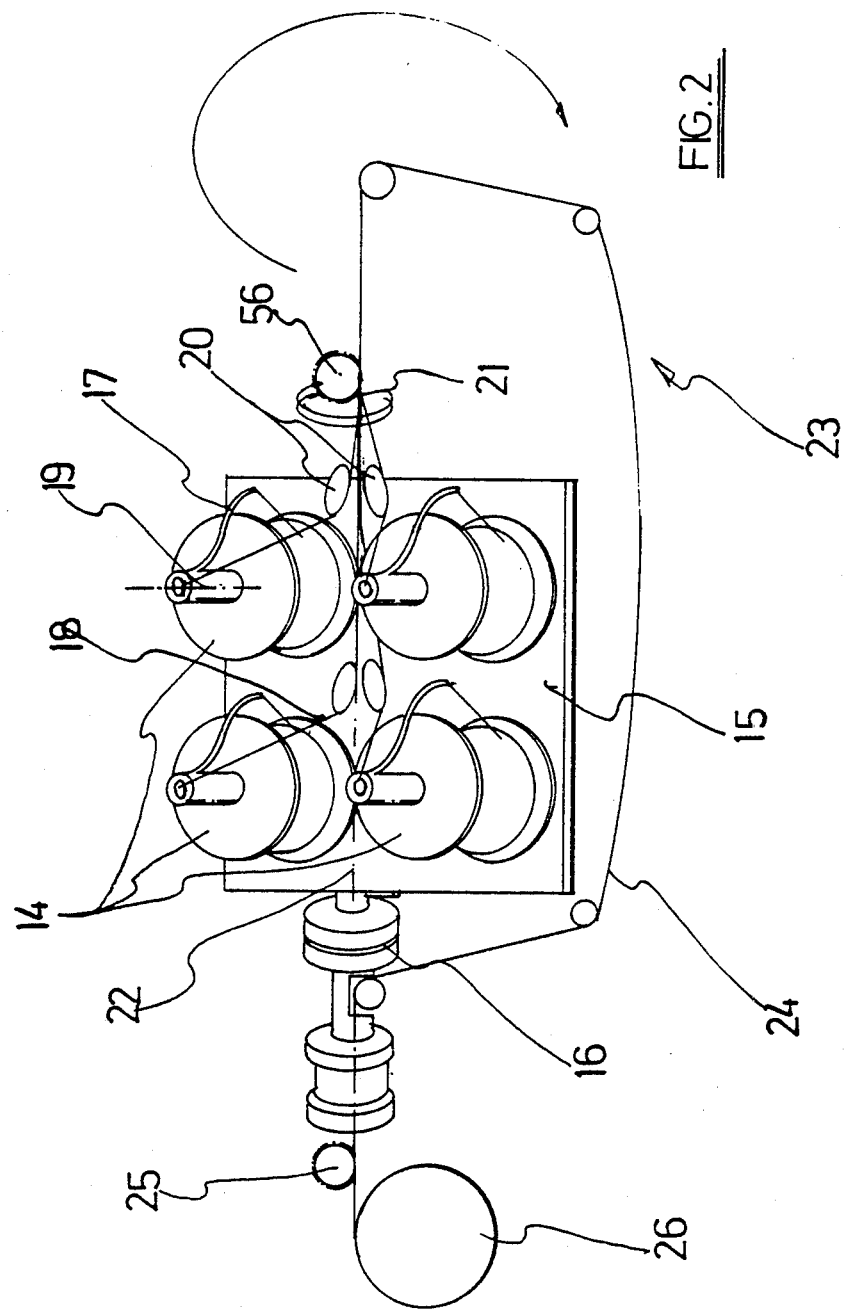
FIG. 2 is a schematic view of a machine to manufacture a cord in accordance with the invention.

In FIG. 2 the apparatus for making a cord is shown.

Four spools 14 loaded with bundles of seven filaments are positioned in the collecting cradle 15 which is suspended between roller-bearings 16. In this way the cradle and the spools act as a fixed point. Using a loose unwinding flyer arm 17, the bundle 18 is removed from the spool 14 along the axis 19 of the spool and neutralizes at the same time the lay which was introduced in the bundle when the spool was filled. The filaments bundles which have, in effect, no average lay anymore, are guided over guiding wheels 20 to an assembling point 21 on the common axis 22 of the rollers 16 supporting the cradle. Preferably, the point 21 is situated also on the circumference of a false twister 56 which consists of a wheel which supports one to four windings of the cord 24 and which revolves around the axis 22 in the same direction and at twice the speed of member 23.

The member 23 is a flyer having a transmission arc which guides and transmits the cord from one side to the other side of the cradle. Every rotation of this member 23 will submit the length of cord, transmitted during this time-interval, to a double twist; this means a torsion of twice 360°. The length of lay in the cord 24 caused by this proportion will correspond to the final length of lay.

Accordingly, rotary movement of the flyer 23 submits the cord to a twist level comparable to the final length of lay of the cord 24. The spooling of bundles on the spools and the unwinding as described in the Luxemburg Pat. No. 74.716 have no other purpose than to deliver in the interior of the machine some bundles having a net level of twist equal to zero and to deliver a number of filaments into the bundle which do not show intolerable length differences. Preferably the lay direction of the bundles on the spools 14 will be the same as the lay direction to be given to the cord afterwards.

Nevertheless this measure is not necesary; the bundles can even be split into groups wound in opposite directions. A substantially uniform and equal unwinding tension between the bundles is desirable.

The cord 24 as it has been formed may undergo, according to the principles of known technology, a straightening operation, an untwisting and overtwisting in agreement with the needs, at the treatment station 25, in order to obtain the required quality of straightness and balance of internal torque. Thereafter the cord is wound on a receiving spool 26.

Figure 3:
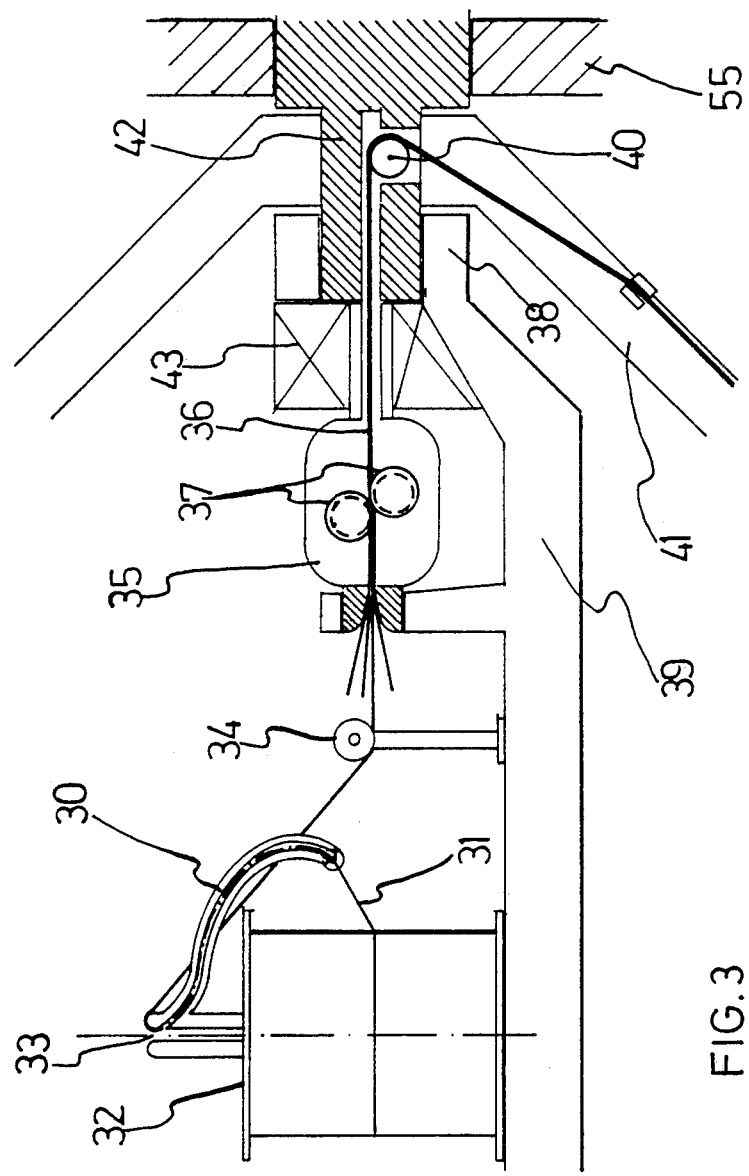
FIG. 3 is a more detailed view of the machine.

In order to clarify the possibility of the process according to the invention, the exit side of the cradle is shown in greater detail in FIG. 3.

An unwinding revolving flyer 30 takes a bundle 31 from the spool, guides this bundle through an orifice 33 to a guide wheel 34 which guides the filament bundle, having at this spot a net amount of twist equal to zero, towards the twister 35.

The different bundles that will compose the cord, join each other as close to the twister 35 as possible. The cord 36 is led through the wheels 37 in the form of a figure eight and passes across the axial portion of the bearing 38 carrying the cradle 39 and leaves this bearing over an intermediate guiding wheel 40 moving integrally with the flyer 41 which is functioning as a transmission arc.

The axial portion 42 which bears the flyer 41 is in turn supported by the machine frame 55. The rotational speed of the twister 35 is imposed by a transmission system 43, which permits the selection of the number of rotations between the number of rotations of flyer 41 and four times that number. The expression "speed" will be considered in this context as the number of rotations performed during the transmission of one meter of length.

Nevertheless, in most cases it is preferred to impose a rotational speed to the false twister 35 which is double the speed of the flyer 41. Using this relation it has been possible to realise a number of combinations as shown in table I. The diameter of the filaments in each case was 0.175 mm.

TABLE I

| Number of bundles | Number of filaments per bundle | Construction |
|---|---|---|
| 4 | 7 | 4 × 7 |
| 3 | 7 | 3 × 7 |
| 2 | 6 | 2 × 6 + 1 × 7 |
| +1 | 7 | |
| 4 | 4 | 4 × 4 |
| 4 | 5 | 4 × 5 |
| 4 | 6 | 4 × 6 |
| 3 | 4 | 3 × 4 |
| 3 | 3 | 3 × 3 |
| 2 | 3 | 2 × 3 |
| 2 | 4 | 2 × 4 |
| 3 | 9 | 3 × 9 |
| 3 | 10 | 3 × 10 |

It is also possible to obtain the cords without using an equipment as indicated by the index 35. This manner is preferably used for constructions which contain a number of bundles greater than four. Examples realised according to such practice with filaments with a diameter of 0.175 are shown in Table II.

TABLE II

| Number of bundles | Number of filaments per bundle | Construction |
|---|---|---|
| 5 | 4 | 5 × 4 |
| 5 | 5 | 5 × 5 |
| 5 | 6 | 5 × 6 |
| 5 | 7 | 5 × 7 |
| 6 | 4 | 6 × 4 |
| 6 | 7 | 6 × 7 |
| 7 | 4 | 7 × 4 |

Figure 4:
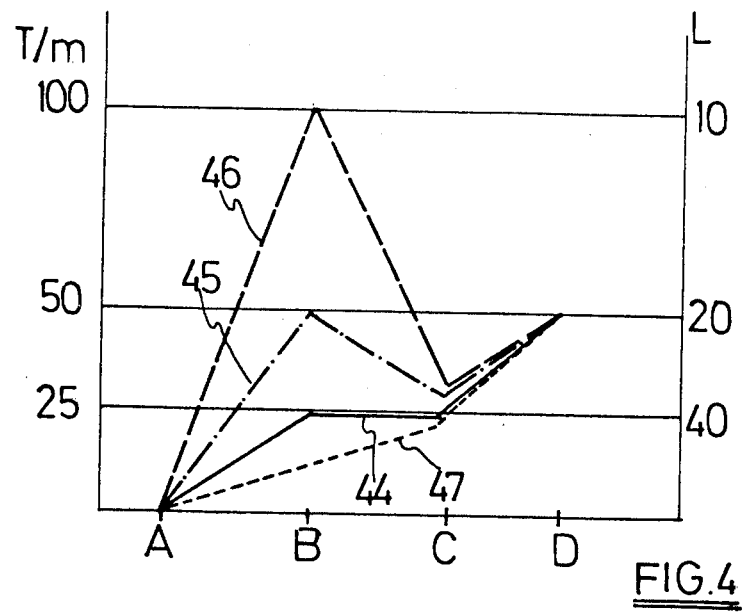
FIG. 4 shows the number of twists per meter generated in the cord at different manufacturing stages.

The number of twists introduced in one meter of cord T/m is shown in FIG. 4 as well as the corresponding length of lay L in mm; this example concerns a cord having a final length of lay of 20 mm.

A represents the twisting level equal to zero of the bundles before thay are taken by the rotational members.

B represents the number of twists introduced by a twisting member such as 23 in FIG. 2.

C represents the number of twists in the cord when passing over the intermediate guideroller 40.

D is the number of twists finally obtained in the cord.

The four lines 44, 45, 46 and 47 schematically represent different method paths. The path 44 is applicable e.g. when the false twister 55 rotates with the same speed as member 23. The path 45 represents a preferred operational method where, after a prior twist equal to the twist of the finished cord, a fair untwist is performed which can be equal to the twist introduced at the first deflexion of the transmission arc 23. The path 46 represents an operation where the cord is overtwisted to double that of the final cord twist. The amount of overtwist is a way to influence the elastic cord properties.

In same cases it is preferred not to use twisting devices 56 of FIG. 2 and 35 of FIG. 3 and the path followed during the operations will resemble 47 of the FIG. 4.

The temporary untwisting of the cord after the prior forming, allows the individual filaments and, in certain cases, the different bundles, to accept a repositioning which corresponds to the most closely packed structure. The cross-section of the cord is similar to a cord with a central core and peripheral layers of filaments disposed there-around. The small length differences are absorbed by a more or less pronounced undulation. The shorter filaments rather tend to take a position in the core of the cord.

Figure 5:
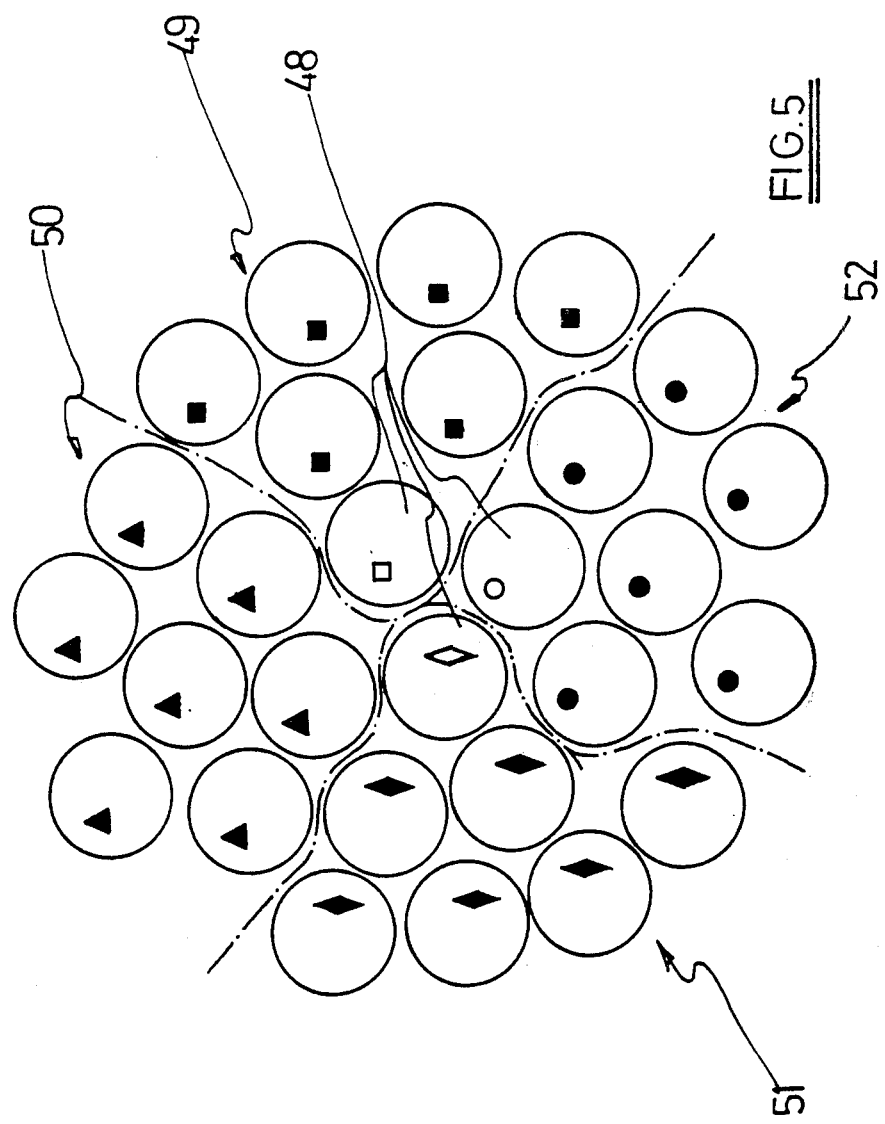
FIG. 5 is a cross sectional view of an embodiment of cord.

FIG. 5 shows the cross-section of a cord composed of four bundles of seven filaments of 0.22 mm. The average length of lay of the bundles in the cord is 20 mm and is the same as the length of lay of the filaments comprising the bundles and in the same direction. This FIG. 5 also shows the grouping of filaments into a compact configuration or structure in which three filaments 48 function as a core while the other filaments assume incidental positions in peripheral layers around this core.

Filaments belonging to different bundles 49, 50, 51, 52 are separated in the drawing by dotted lines and carry distinct signs, square, triangular, diamond or circular shaped. Filaments making up in effect a core bear an outline sign. These filaments belong to different bundles and change relative position in an indeterminate way along the bundle length with other filaments belonging to the same bundle or to other bundles. Such cord is suited for the reinforcement of flexible rubber hoses.

Figure 6:
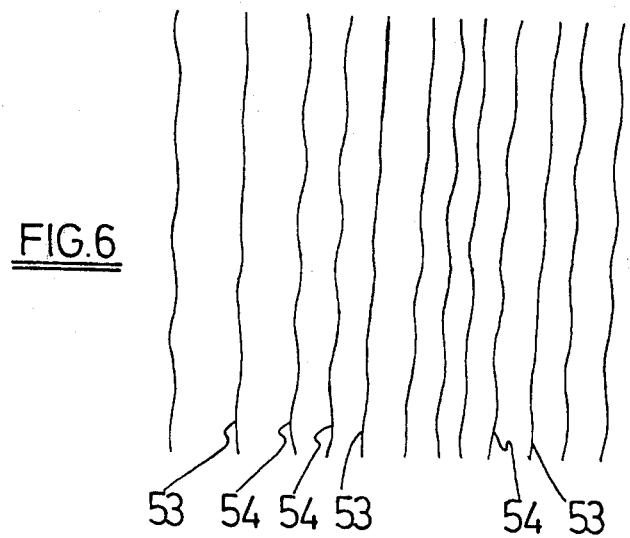
FIG. 6 is a view of the profile of some filaments after disassembling a length of cord.

In order to have a better understanding of the filament behaviour, a piece of cord as shown in FIG. 5 has been disassembled, and the profile of several filaments in their deformed shape in the cord are shown in FIG. 6. Some filaments 53 of slightly shorter length display a less pronounced deformation as compared with other filaments 54, the length of the deformation cycle of all filaments being substantially the same. A similar explanation may be given for bundles, if the cord contains more than four bundles.

The advantage of the cord described is that it can be made in a relatively simple manner as a construction built up by different strands and that it shows unexpectedly the characteristics and properties of a cord having multiple peripheral layers. A stable and balanced construction is obtained by avoiding the drawbacks of a construction with peripheral layers. The linear contacts between filaments improve the resistance to internal abrasion and reduce the breaking load losses.

The stresses to which the cord is submitted are divided among different filaments and bundles and the load distribution is made more uniform.

Similar cord configurations are considered to be equivalent.

Bundles of the same cord may contain a different number of filaments and only in extreme cases consist of a single filament. Clearly the filament size may vary in the same bundle and also between different bundles. Preferably however the bundles have the same number of identical filaments. Different configurations within the scope of the invention comprise also the use of any other metal than non-alloyed plain high-carbon steel or stainless steel if in service conditions it shows a resistance level sufficiently high to sustain the requirements to reinforce the reinforced article.

The length of lay of the filaments in the bundles and of the bundles in the assembled cord may depend on the size of the filaments, the number of filaments in the bundles, the overall diameter of the cord, the desired flexibility of the cord, the amount of prior twist and other factors. In order to affect the stiffness and the elastic flexibility of the cord, it is known in practice to wrap a spiral filament around the cord, described for example in French Pat. No. 1,273,610. The regular length of lay of the wrap is between 2 mm and 6 mm on cords having a diameter of 0.5 to 10 mm, preferably it is 3.5 mm and the direction of the lay is preferably opposed to the cord twist, the filament size preferably being 0.15 mm.

The embodiment provided with a spiral wrap wire is particularly suitable as a reinforcing element for vehicle tyres. A multitude of parallel cord pieces, arranged side by side between two rubber layers and cut to an equal length can be used as the reinforcing element as well in the carcass as in the belts of radial tires.

The loss in breaking load has been evaluated by comparing test results of cords I according to the invention after a life time equivalent to 100.000 km as heavy truck tires. Table III shows a comparison of this performance and other mechanical properties with those of two known cord constructions.

TABLE III

|  | 3 + 9 + 15 × 0,175 + 0,15 5/10/16/3,5 S S Z S | 7 × 4 × 0,175 + 0,15 10/10/20/3,5 S S Z S | I 4 × 7 × 0,175 + 0,15 20/20/3,5 S S Z |
|---|---|---|---|
| Diameter mm | 1,333 | 1,444 | 1,365 |
| weight/meter ktex | 5,427 | 5,61 | 5,57 |
| % of filled section | 49,5 | 43,5 | 48,4 |
| breaking load N | 1720 | 1810 | 1820 |
| loss due to twisting % | 3,18 to 6,22 | 1,7 | 1,10 |
| D % | 1,94 to 5,53 | 4,31 | 3,51 |

I claim:

1. A metal cord having a core filament of filaments for reinforcement of rubber articles comprising a plurality of bundles of grouped filaments wherein the direction of lay of the filaments in the bundles is the same as the direction of lay of the bundles in the cord, each of each filaments having been subjected to plastic torsional deformation, the average length of lay of each bundle in the cord being substantially equal to the average length of lay of each filament in the bundles, and wherein at any cross-section of the cord the filaments comprising the core of the cord differ along the length of the cord and belong to the same or different bundles.

2. A cord according to claim 1, in which each bundle contains two to nineteen filaments.

3. A cord according to claim 2, in which each bundle contains less than ten filaments.

4. A cord according to claim 1, 2 or 3 in which each bundle contains the same number of identical filaments.

5. A cord according to claim 1 in which the filaments are indeterminately intermixed and that the cord cross-section has the structure of a core surrounded by one or more concentric peripheral layers of filaments.

6. A cord according to claim 7 in which the cord is surrounded by a spiral wrapped wire having a lay in the opposite direction to the lay of the cord.

7. An article of rubber reinforced by at least one cord of claim 1.

8. An article of rubber reinforced by a plurality of parallel pieces of cord according to claim 1.

9. A method of manufacturing metal cord having a core filament or filaments for the reinforcement of rubber articles including the steps of combining together a multiplicity of filaments to form a plurality of bundles having no lay, and combining the bundles together in a plastic torsional deforming bunching operation in such a way that the filaments in the bundles have an equal average length of lay and the same direction of lay as that of the bundles in the cord and wherein at any cross-section of the cord the filaments comprising the core of the cord differ along the length of the cord and belong to the same or different bundles.

10. A method according to claim 9 in which the bundles are twisted firstly to a length of lay less than the final length of lay, the cord is then untwisted to a length of lay greater than the final length of lay and twisted to the final length of lay and then subjected to a straightening and relaxing operation.

11. A method according to claim 9 in which the bundles are twisted firstly to a length of lay of between half the final lay and the final lay, the cord being subsequently untwisted to a length of lay of between the final lay and twice the final lay, the cord is then twisted to the final lay, and a straightening and relaxing operation is performed thereafter on the cord.

12. A method according to claim 9 in which the bundles are twisted firstly to a length of lay substantially equal to the final length of lay, the cord is then untwisted to a length of lay substantially equal to twice the final length of lay, the cord is then twisted to the length of lay and then subjected to a straightening and relaxing operation.

13. A method according to claims 9, 10, 11 or 12 including wrapping a filament spirally around the core.

* * * * *